UNITED STATES PATENT OFFICE 2,318,729

PROCESS FOR MAKING AMINO-ALKYL COMPOUNDS

Alexander L. Wilson, Sharpsburg, Pa., assignor to Carbide and Carbon Chemicals Corporation, a corporation of New York No Drawing. Application May 24, 1941,
Serial No. 395,024

14 Claims. (Cl. 260—383)

This invention relates to the production of beta-aminoalkyl nitrogen derivatives by the reaction of alkylene imines with basic nitrogen compounds containing an amino group posssessing a reactive hydrogen atom, and the invention is particularly directed to the preparation of beta-amino-ethyl and beta-aminoisopropyl derivatives by the reaction of ethylene and propylene imine respectively with primary or secondary amines.

The reactions of the highly basic substance, ethylene imine, with strong acids, such as hydrochloric and sulfuric acids; with weakly acidic bodies, such as hydrogen sulfide, and organic esters, amides, acids, halides, and aldehydes; and the polymerization of ethylene imine to viscous or waxy products in the presence of acid catalysts, are known, but beta-aminoalkyl compounds have not heretofore been prepared by the reaction of an alkylene imine with basic amines having a replaceable hydrogen atom attached to the nitrogen atom. It has been found that alkylene imines react readily with such primary or secondary amines to form beta-aminoalkyl derivatives. This invention is predicated on the discovery that alkylene imines react with basic primary or secondary amino groups with the breaking of the imine ring and the shifting of the more labile hydrogen atom of the amino group to the nitrogen atom of the alkylene imine to form beta-aminoalkyl nitrogen derivatives.

The general reactions which alkylene imines undergo with primary or secondary amines may conveniently be divided into two stages. In the first stage, the imine adds to the amino compound to form a simple beta-aminoalkyl derivative, and this is the basic or fundamental type reaction with which the present invention is concerned. It is represented by the following general equation, employing ethylene imine as an example:

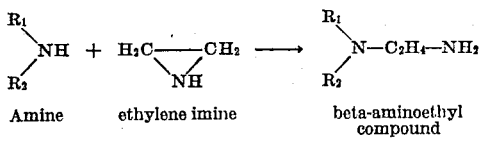

where $R_1$ and $R_2$ represent any radicals, or parts thereof, which may be present in primary or secondary amines, $R_1$ being hydrogen when a primary amine is involved.

The second stage of the reaction may be considered the addition of one or more molecules of the imine to the beta-aminoalkyl derivative produced in the first stage to form polyamine derivatives. Many new compounds may be produced by this second stage reaction, particularly certain unsymmetrical disubstituted derivatives of the dialkylene triamines. The reaction is illustrated by the following general equation, employing ethylene imine as an example:

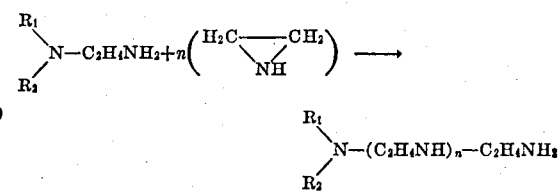

wherein $n$ represents the number of ethylene imine molecules entering into the reaction.

In general, a high molar ratio of amino compound to the alkylene imine, for instance 5 to 1, will favor the formation of the simple beta-aminoalkyl derivatives, whereas lower ratios of the amino compounds to the imine promote the formation of the polyamine type compound. It is significant to note that even where as much as two mols of the imine are to be reacted with one mol of the amino compound, it is necessary to have an excess of the amino compound present to prevent the formation of the higher boiling polyamines, which are frequently a less desirable product. Water has been found to be an effective catalyst for the reaction and it is desirably included in relatively large amounts. Where the production of the higher polyamines is to be suppressed, the effect of the water catalyst may be inhibited by the addition of caustic. Reaction temperatures may be between 0° and 200° C., a slow but appreciable reaction occurring at room temperatures. Inert diluents, for instance alcohols, may also be added to control the reaction or to serve as mutual solvents for the reactants.

Alkylene imines which may be employed in the process of this invention include N-substituted imines as well as unsubstituted imines, such as ethylene imine, propylene imine and butylene imine. These imines are liquids of moderate boiling points having strong ammoniacal odors. In the alkylene imines alkyl or aryl radicals may also be substituted at the nitrogen atom, an example of such a compound being N-butyl ethylene imine. The alkylene imines as a group may be represented by the following formula:

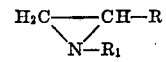

where R is hydrogen or an alkyl radical, and $R_1$ is hydrogen or a monovalent organic radical, such as an alkyl, a cycloalkyl, aryl or aralkyl group. Other examples of N-substituted alkylene imines include N-propyl, N-phenyl and N-cyclohexyl ethylene imines. The alkylene imines may be formed by known reactions, such as by heating aminoethyl sulfate with aqueous sodium hydroxide in the case of ethylene imine.

In the process of this invention, any basic primary or secondary amine may be employed and the following list of suitable amines is in no sense exclusive:

*Aromatic amines.*—Aniline, aminoethyl aniline, toluidine, benzidine, methylaniline, benzylamine and naphthylamine.

*Aliphatic amines.*—Diethyl amine, butyl amine, dibutyl amine, ethylene diamine, diethylene triamine, ethanolamine, diethanolamine, isopropanolamine, octyl amine, dioctyl amine.

*Cyclic amines.*—Morpholine, cyclohexyl amine, piperazine.

*Miscellaneous amino compounds.*—Diaminodiethyl ether, diaminodiethyl sulfide, sodium glycinate, phenyl hydrazine.

The present invention considerably multiplies the types of alkylene polyamines which may be produced. It is especially useful for converting lower alkylene polyamines into higher alkylene polyamines. For instance, ethylene diamine, diethylene triamine, and triethylene tetramine may be transformed into products as high as undecaethylene dodecamine by reaction with ethylene imine under appropriate conditions as previously discussed. By the reaction of an alkylene polyamine with an alkylene imine having a different alkylene group, mixed alkylene polyamines may be formed. Furthermore, alkylene polyamines having terminal monoalkyl groups are readily produced by the reaction of monoalkyl amines with alkylene imines. In this latter case, if the alkylene imine is N-substituted, the alkylene polyamine produced will be substituted at the other terminal amino group as well.

The term "alkylene polyamine" as used in this specification and in the appended claims includes both monoalkylene diamines and polyalkylene polyamines, irrespective of whether such compounds are of straight chain or branched chain configuration and whether such compounds have terminal substituted amino groups or terminal primary amino groups. The term "beta-aminoalkyl nitrogen derivative" as set forth herein includes N-substituted beta-amino alkyl nitrogen derivatives such as are formed by the reaction of N-substituted alkylene imines with primary or secondary amino compounds.

Some compounds are novel in which at least two molecules of the alkylene imine have combined with a single molecule of a secondary amine, such as dioctyl amine, dibutyl amine, diethanolamine or morpholine. Their structure may be represented as follows:

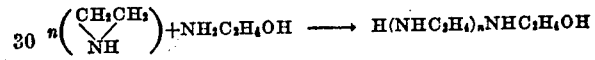

where R is hydrogen or an alkyl radical, $R_1$ is hydrogen or an alkyl, cycloalkyl, aryl or aralkyl and $R_2$ and $R_3$ are alkyl, aryl or alkylol radicals, $n$ being 1, 2, 3 or 4. $R_2$ and $R_3$ together may be parts of a divalent organic radical.

These asymmetrical disubstituted alkylene polyamines are exceptionally valuable in the formation of surface active agents, such as emulsifying agents and textile finishing agents, probably owing their efficacy to their capacity for condensation with fatty acids. In general, the amino compounds produced by the method of this invention are valuable intermediates in organic syntheses, as in the preparation of dyes, rubber accelerators, and medicinal products. They are also useful as corrosion inhibitors and as stabilizers. In addition, the higher boiling alkylene polyamines, because of their high absorptive capacity for water vapor and acid gases, may be used in processes for purifying and dehydrating gases.

The following examples illustrate typical embodiments of the invention.

*Example 1.*—Beta-aminoethyl aminoethanol was prepared by the reaction of ten parts by weight of ethylene imine with 153 parts by weight of monoethanolamine for five hours at 145° to 160° C. at 10 pounds per square inch pressure in an autoclave. At the end of the five-hour period the mixture from the autoclave was distilled, yielding 13 parts of beta-aminoethyl aminoethanol (or beta-hydroxyethyl ethylene diamine) along with unreacted ethanolamine. This corresponded to a yield of about 60%. The ethylene imine reacted with the ethanolamine according to the following general reaction where $n$ equals 1 for the formation of beta-aminoethyl aminoethanol:

*Example 2.*—Diethylene triamine was prepared by reacting 129 grams (3 mols) of ethylene imine with 900 grams (15 mols) of ethylene diamine in the presence of 3087 grams (171.5 mols) of water which constituted 75% of the charge). The reaction was effected by refluxing the reactants for four hours at a temperature of 98° to 100° C., and then the products were separated by fractional distillation. The yield of diethylene triamine was 213 grams (2.06 mols) or a yield of 69% on the imine basis. Thirty-four grams (0.23 mol) of triethylene tetramine and 3.5 grams (0.02 mol) of tetraethylene pentamine were formed as by-products.

*Example 3.*—Mono-octyl ethylene diamine was prepared by refluxing for forty hours a mixture of 268 parts of mono-octyl amine, 23 parts of a 96% aqueous solution of ethylene imine, 548 parts of water and 395 parts of 95% ethanol. At the end of this time the mixture was distilled, and the yields on the ethylene imine basis were mono-octyl ethylene diamine 39%, mono-octyl diethylene triamine 17% and higher polyamines 25%.

Mono-octyl ethylene diamine was found to have a boiling point of 70° to 80° C. at 1 mm., a specific gravity (20/20) of 0.853, a refractive index (20/$d$) of 1.4518, an equivalent weight of 87, and to be partially miscible with water.

Mono-octyl diethylene triamine was found to boil at 105° to 115° C. at 1 mm., and to be miscible with water.

*Example 4.*—Aminoethyl diethyl amine was prepared by refluxing 657 grams (9 mols) of diethyl amine with 129 grams (3 mols) of ethylene imine in 2358 grams (131 mols) of water for thirty hours at 60° to 70° C.

The desired product was separated by fractional distillation, the bulk of it passing over as a constant boiling mixture with water in the third fraction which distilled at a temperature of 95° to 98° C. This fraction was found to contain 19% to 20% of the amine product by weight, and, after successive decantations with 50% sodium hydroxide solution, 150 grams of material boiling at 100° to 147° C. and analyzing 90% aminoethyl diethyl amine were secured. The yield of aminoethyl diethyl amine was 1.20 mols, representing a yield of 40% on the imine basis. It was found that 0.22 mol of diethyl diethylene triamine and 0.07 mol of higher polyamines were formed as by-products.

*Example 5.*—Aminoethyl dibutyl amine was prepared by the reaction of 774 grams (6 mols) of dibutyl amine with 86 grams (2 mols) of ethylene imine in a mixed solvent made up of 985 grams (54.7 mols) of water and 1495 grams (16.6 mols) of the monoethyl ether of ethylene glycol. The process was carried out by heating the mixture at 90° to 95° C. for sixteen hours. The product was then separated by fractional distillation, the bulk of the aminoethyl dibutyl amine coming off in the fraction which distilled at 97° to 98° C. The product was separated from the solvent, dried and purified. Seventy-eight grams of pure aminoethyl dibutyl amine were recovered which represented a yield of 23% on the imine basis. Some dibutyl diethylene triamine and higher polyamines were formed as by-products.

Aminoethyl dibutyl amine is an odorless liquid less than 1.0% soluble in water, with a boiling point of 210° to 220° C. and a specific gravity of 0.81.

Dibutyl diethylene triamine was found to boil in the range of 270° to 290° C., and to be completely miscible in water. It yields solutions of high foaming activity.

*Example 6.*—Aminoethyl morpholine was prepared by the reaction of ethylene imine with morpholine according to the following general equation where $n-1$ for the formation of aminoethyl morpholine:

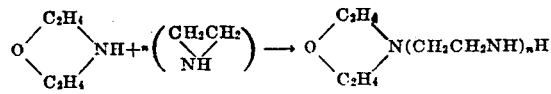

Three hundred and thirteen parts by weight of morpholine and 43 parts by weight of ethylene imine were placed in an autoclave and sufficient water was added to bring the water concentration up to 75%. The mixture was heated for eighteen hours at about 100° C. At the end of this time the reaction mixture was distilled to yield 245 parts of morpholine, 91 parts of aminoethyl morpholine and 8 parts of morpholino-ethyl ethylene diamine,

This represented a yield based on the amine of 83.5% for the aminoethyl morpholine and 5.4% for the morpholino-ethyl ethylene diamine.

The condensation products of aminoethyl morpholine and morpholino-ethyl ethylene diamine with fatty acid substances are disclosed and claimed in my application Serial No. 404,842.

*Example 7.*—Aminoethyl diethanolamine was prepared by refluxing 788 grams (7.5 mols) of diethanolamine with 65 grams (1.5 mols) of ethylene imine in 2556 grams (142 mols) of water for three hours at 98° C. The product was separated by fractional distillation at reduced pressure, and the bulk of it was removed as a fraction boiling in the range of 159° to 215° C. at a pressure of 3 mm. This fraction contained 41% of diethanolamine and 59% of aminoethyl diethanolamine, representing a yield of 68% on the ethylene imine basis and a process efficiency of 96% on the diethanolamine basis.

*Example 8.*—Ethylene imine reacts with amines, at relatively high ratios of imine to amine, with the production of high boiling polyamines bearing terminal amino groups. The rate of reaction in water solution increases with the extent of dilution and is very slow at water concentrations below about 50%.

An aqueous solution of ethylene imine and ethylene diamine containing 25% ethylene imine and 2.5% ethylene diamine was refluxed for thirteen hours and then analyzed by distillation. Based on a charge of 100 parts of ethylene imine and 10 parts of ethylene diamine, 102 parts of a polyamine having an approximate average molecular weight of 490 and boiling above 215° C. at 2 mm. of mercury were secured. The balance of the imine was consumed in the formation of small amounts of diethylene triamine and triethylene tetramine.

*Example 9.*—Aminoethyl aniline, also called phenyl ethylene diamine, was prepared by mixing 465 parts (5 mols) of aniline, 43 parts (1 mol) of ethylene imine and 1524 parts (84.6 mols) of water and refluxing the mixture for sixty-four hours. At the end of this time the reaction mixture was distilled and water and unreacted aniline separated. The yield of aminoethyl aniline was 14%, and the yield of phenyl diethylene triamine was 26%. The aminoethyl aniline was purified and found to have an equivalent weight of 138 as compared with the theoretical weight of 136. The boiling point was 105° to 115° C. at 9 mm. or 263° to 270° C. at 740 mm., the true boiling point probably being 268° to 269° C. at the latter pressure.

*Example 10.*—Twenty grams (0.20 mol) of N-butyl ethylene imine, 85 grams of a 70% aqueous solution of ethylene diamine (containing 1.0 mol of ethylene diamine) and 215 grams (12 mols) of water were heated together under gentle reflux for sixteen hours and then fractionally distilled. Twenty-four grams of butyl diethylene triamine were recovered, representing a yield of 75% on the imine basis, showing that the ring structure of the imine is broken and that the formation of aminoalkyl amines occurs when an alkylene polyamine reacts with a nitrogen substituted imine.

Butyl diethylene triamine, as prepared, was a liquid boiling at 140° to 150° C. at 31 mm. pressure, and its titration neutralization curve closely resembled the curve of diethylene triamine. The equivalent weight was 54.7 compared with the theoretical value of 53.1.

Other modifications of the process will be apparent and are included in the invention as defined by the appended claims.

I claim:

1. Process for preparing beta-aminoalkyl nitrogen derivatives which comprises reacting a 1,2 alkylene imine with essentially only a non-acylated basic amine having at least one reactive hydrogen atom attached to an amino nitrogen atom.

2. Process for preparing beta-amino-alkyl nitrogen derivatives which comprises reacting a N-substituted 1,2-alkylene imine with a basic amine having at least one reactive hydrogen atom attached to an amino nitrogen atom.

3. Process for preparing beta-aminoalkyl nitrogen derivatives which comprises reacting a 1,2 alkylene imine with a basic amine having at least one reactive hydrogen atom attached to an amino nitrogen atom, the molar ratio of said amine to said alkylene imine being greater than one.

4. Process for preparing beta-aminoalkyl nitrogen derivatives which comprises reacting a 1,2 alkylene imine with essentially only a non-acylated primary amine.

5. Process for preparing beta-aminoalkyl nitrogen derivatives which comprises reacting a 1,2 alkylene imine with a primary amine in the presence of water, the molar ratio of amine to said alkylene imine being greater than one.

6. Process for preparing beta-aminoalkyl nitrogen derivatives which comprises reacting a 1,2 alkylene imine with a non-acylated secondary amine.

7. Process for preparing beta-aminoalkyl nitrogen derivatives which comprises reacting a 1,2 alkylene imine with a secondary amine in the presence of water, the molar ratio of amine to said alkylene imine being greater than one.

8. Process for preparing hydroxy-alkyl alkylene polyamines which comprises reacting a 1,2 alkylene imine with a secondary alkylol amine.

9. Process for preparing hydroxy-alkyl ethylene polyamines which comprises reacting ethylene imine with a secondary alkylol amine.

10. Process for preparing higher alkylene polyamines which comprises reacting a 1,2 alkylene imine with a non-acylated lower alkylene polyamine having a primary terminal amino group.

11. Process for preparing higher ethylene polyamines which comprises reacting ethylene imine with a non-acylated lower ethylene polyamine having a primary terminal amino group.

12. Process for making higher alkylene polyamines which comprises reacting a 1,2-alkylene imine with a lower alkylene polyamine having a primary terminal amino group, the molar ratio of said lower polyamine to said alkylene imine being greater than one.

13. Process for preparing unsymmetrical dialkyl substituted alkylene polyamines which comprises reacting a 1,2 alkylene imine with a dialkyl amine.

14. Process for preparing unsymmetrical dialkyl substituted ethylene polyamines which comprises reacting ethylene imine with a dialkyl amine.

ALEXANDER L. WILSON.

CERTIFICATE OF CORRECTION.

Patent No. 2,318,729. May 11, 1943.

ALEXANDER L. WILSON.

It is hereby certified that error appears in the printed specification of the above numbered patent requiring correction as follows: Page 2, second column, line 37, after "charge" and before the period, strike out the closing parenthesis; page 3, first column, line 58, for "amine" read --imine--; and second column, line 69, for "snbstituted" read --substituted--; and that the said Letters Patent should be read with this correction therein that the same may conform to the record of the case in the Patent Office.

Signed and sealed this 22nd day of June, A. D. 1943.

(Seal)

Henry Van Arsdale,
Acting Commissioner of Patents.